United States Patent Office 3,579,525
Patented May 18, 1971

3,579,525
S-(PYRIDYL)METHYL THIO- AND DITHIO-CARBAMATES
Harry Tilles, El Cerrito, and Mervin E. Brokke, Moraga, Calif., assignors to Stauffer Chemical Company, New York, N.Y.
No Drawing. Filed Oct. 7, 1968, Ser. No. 765,681
Int. Cl. C07d 31/50
U.S. Cl. 260—294.8                          32 Claims

ABSTRACT OF THE DISCLOSURE

S-(pyridyl)methyl thio- and dithio-carbamates having the formula

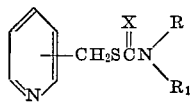

in which X is oxygen or sulfur, R and $R_1$ are independently alkyl, alkenyl, or cyclohexyl and R and $R_1$ taken together are alkylene and dialkyl substituted alkylene, provided that when X is sulfur and R and $R_1$ are both alkyl, at least one of the alkyl groups contains 3 or more carbon atoms. The above compounds, as well as those excluded by the proviso, are effective herbicides. Representative compounds are S-(3-pyridyl)methyl di-n-propylthiocarbamate,
S-(2-pyridyl)methyl di-n-butylthiocarbamate,
S-(4-pyridyl)methyl methylcyclohexylthiocarbamate,
S-(4-pyridyl)methyl ethyl-n-butylthiocarbamate and S-(3-pyridyl)methyl 1 - (5-ethyl-2-methyl-piperidinecarbothioate).

---

This invention relates to certain novel S-(pyridyl) methyl thio and dithio-carbamates which are useful as herbicides. The compounds of the present invention which are new compositions of matter correspond to the formula

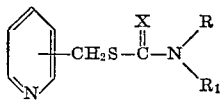

in which X is oxygen or sulfur, R and $R_1$ are independently alkyl, alkenyl, cyclohexyl, and R and $R_1$ taken together are alkylene and dialkyl-substituted alkylene, provided that when X is sulfur and R and $R_1$ are both alkyl, at least one of the alkyl groups contains 3 or more carbon atoms.

The method of the present invention of controlling undesirable vegetation comprises applying an herbicidally effective amount of the above-described compounds to the area where control is desired. Compounds wherein X is sulfur and R and $R_1$ are independently allkyl are within the scope of this aspect of the present invention.

An herbicide is used herein to mean a compound which controls or modifies the growth of plants. By an "herbicidally effective amount" is meant an amount of compound which causes a modifying effect upon the growth of plants. Such modifying effects include all deivations from natural development, for example, killing, retardation, defoliation, desiccation, regulation, stunting, tillering, stimulation, dwarfing and the like. By "plants" it is meant germinant seeds, emerging seedlings, and established vegetation including the roots and above-ground portions.

In the above description, the following preferred embodiments are intended for the various groups: alkyl preferably includes, unless otherwise provided, those members which contain from 1 to about 6 carbon atoms, inclusive, in both straight chain and branched chain configurations, for example, methyl, ethyl, n-propyl, isopropyl, n-butyl, secbutyl, amyl, isoamyl, n-hexyl, iso-hexyl, and the like; alkenyl preferably includes those members of the group containing at least one double bond beta or gamma to the nitrogen atom and containing from 3 to 4 carbon atoms, inclusive, for example, alyl, 2-butenyl, 3-butenyl, α-methylallyl and the like; alkylene preferably includes those members of the group containing from about 4 to about 6 carbon atoms, inclusive, for example, tetramethylene, pentamethylene and hexamethylene. The term dialkyl substituted alkylene preferably includes those members in which the alkyl groups contain 1 to 4 carbon atoms, more preferably 1 to 2 carbon atoms, inclusive, such as methyl or ethyl; and in which the alkylene moiety preferably contains from about 4 to about 6 carbon atoms, inclusive, for example tetramethylene, pentamethylene or hexamethylene; especially the group 1-methyl-4-ethyl-pentamethylene.

Certain of the compounds found to be novel herbicides in the present invention are known in the prior art. Those compounds in which, in the general formula supra, X is sulfur and R and $R_1$ are alkyl having 1 or 2 carbon atoms are known in Kennard and Burness, U.S. Pat. 2,937,090. However, that patent decribes the compounds as effective photographic emulsion sensitizers when used as quanternary compounds.

The compounds of the present invention are prepared by employing the following general method. An appropriate amine, imine or piperidine is allowed to react with carbonyl sulfide or carbon disulfide in the persence of a base, such as sodium hydroxide. This reaction is preferably performed at reduced temperatures of about 0° C. to about 20° C. To this mixture is added chloromethyl pyridine hydrochloride. The ice bath is then removed and the reaction mixture allowed to warm to room temperature. After stirring for an an interval that can range from about one to about four hours, the reaction mixture is extracted with an organic solvent, such as diethyl ether, and the product recovered by normal workup procedures.

Compounds of the present invention are prepared by the following illustrative examples. Compound numbers according to the example number have been assigned to the compound prepared therein for identification throughout the balance of the specification.

EXAMPLE I

There is charged into a reactor 30.3 g. (0.30 mole) of dipropylamine, 12.0 g. (0.30 mole) of sodium hydroxide and 150 cc. of water. The mixture is cooled to 10° C. and then 19 g. (0.32 mole) of carbonyl sulfide is bubbled into the stirred charge over a period of 9 minutes. The reaction mixture is maintained at 9–13° C. during the addition. Unreacted carbonyl sulfide is prevented from escaping by using a condenser cooled with Dry Ice. The mixture is then stirred at 10–15° C. for an additional five minutes. There is then added as rapidly as possible 24.6 g. (0.15 mole) of 2-chloromethylpyridine hydrochloride. The mixture is stirred in an ice bath for seven more minutes and then the cooling the bath is removed. The contents are allowed to warm up to room temperature with stirring over an interval of 1½ hours. The reaction mixture is then extracted with 250 cc. of ethyl ether and the ether solution is washed with four 100 cc. portions of water, dried over anhydrous magnesium sulfate and concentrated under reduced pressure. The residual liquid is molecular distilled at 0.04–0.06 mm. through a falling film still. There is obtained 33.8 g. (89.4% yield) of S-(2-pyridyl)methyl dipropylthiocarbamate, $n_D^{30}$ 1.5358.

*Analysis.*—Calculated for $C_{13}H_{20}N_2OS$ (percent): C, 61.86; H, 7.99; N, 11.10; S, 12.70. Found (percent): C, 62.01; H, 7.96; N, 10.6; S, 12.74.

EXAMPLE II

Replacing 2-chloromethylpyridine hydrochloride of Example I with an equal molecular weight of 3-chloromethylpyridine hydrochloride, S-(3-pyridyl)methyl di-n-propylthiocarbamate is isolated as described in a yield of 72.5%, $n_D^{30}$ 1.5374.

Analysis.—Calculated for $C_{13}H_{20}N_2OS$ (percent): C, 61.86; H, 7.99; N, 11.10; S, 12.70. Found (percent): C, 61.98; H, 8.18; N, 10.8; S, 12.94.

EXAMPLE III

Replacing 2-chloromethylpyridine hydrochloride of Example I with an equal molecular weight of 4-chloromethylpyridine hydrochloride, S-(4-pyridyl)methyl di-n-propylthiocarbamate is isolated as described in a yield of 89.9%, $n_D^{30}$ 1.5363.

Analysis.—Calculated for $C_{13}H_{20}N_2OS$ (percent): C, 61.86; H, 7.99; N, 11.10; S, 12.70. Found (percent): C, 61.97; H, 8.00; N, 11.05; S, 12.52.

EXAMPLE IV

Di-n-propylamine of Example I is replaced with an equal molecular weight of 2-methyl-5-ethylpiperidine and the carbonyl sulfide is added over a period of 30 minutes at 7–10°. The reaction mixture is stirred for four hours after the addition of the chloromethylpyridine hydrochloride. There is obtained a yield of 78.2% of S-(2-pyridyl)methyl 1-(5-ethyl - 2 - methylpiperidinecarbothioate), $n_D^{30}$ 1.5530.

Analysis.—Calculated for $C_{15}H_{22}N_2OS$ (percent): C, 64.70; H, 7.96; N, 10.06; S, 11.52. Found (percent): C, 64.61; H, 8.04; N, 10.0; S, 11.60.

EXAMPLE V

Replacing 2-chloromethylpyridine hydrochloride of Example IV with an equal molecular weight of 3-chloromethylpyridine hydrochloride, S-(3-pyridyl)methyl 1-(5-ethyl-2-methylpiperidinecarbothioate) is isolated as described in a yield of 70.8%, $n_D^{30}$ 1.5540.

Analysis.—Calculated for $C_{15}H_{22}N_2OS$ (percent): C, 64.70; H, 7.96; N, 10.06; S, 11.52. Found (percent): C, 64.57; H, 7.69; N, 10.0; S, 11.38.

EXAMPLE VI

Replacing 2-chloromethylpyridine hydrochloride of Example IV with an equal molecular weight of 4-chloromethylpyridine hydrochloride, S-(4-pyridyl)methyl 1-(5-ethyl-2-methylpiperidinecarbothioate) is isolated as described in a yield of 71.6%, $n_D^{30}$ 1.5535.

Analysis.—Calculated for $C_{15}H_{22}N_2OS$ (percent): C, 64.70; H, 7.96; S, 11.52. Found (percent): C, 64.97; H, 8.28; S, 11.44.

EXAMPLE VII

Replacing dipropylamine of Example I with an equal molecular weight of hexamethyleneimine, S-(2-pyridyl)methyl hexahydro-1H-azepine-1-carbothioate is isolated as described in a yield of 66.5%, $n_D^{30}$ 1.56.12.

Analysis.—Calculated for $C_{13}H_{18}N_2OS$ (percent): C, 62.36; H, 72.5; N, 11.19; S, 12.81. Found (percent): C, 64.93; H, 8.46; N, 11.51; S, 10.67.

EXAMPLE VIII 2-chloromethylpyridine hydrochloride of Example VII is replaced by an equal molceular weight of 3-chloromethylpyridine hydrochloride. Instead of being molecular distilled as in the previous examples in which all distillable material is collected as product, this crude product is distilled through a simple Claison-type distillation apparatus in which a forecut is taken and discarded. The product, S - (3-pyridyl)methyl-1H-azepine-1-carbothioate is obtained in 58.8% yield, B.P. (0.04 mm.) 162–172° C. $n_D^{30}$ 1.5731.

Analysis.—Calculated for $C_{13}H_{18}N_2OS$ (percent): C, 62.36; H, 7.25; N, 11.19; S, 12.81. Found (percent): C, 62.65; H, 7.24; N, 11.02; S, 12.88.

EXAMPLE IX

Replacing hexamethyleneimine of Example VIII with an equal molecular weight of diethylamine, S-(3-pyridyl) methyl diethylthiocarbamate is isolated as described in a yield of 65.3%, B.P. (0.04–0.03 mm.) 112–122° C., $n_D^{30}$ 1.5506.

Analysis.—Calculated for $C_{11}H_{16}N_2OS$ (percent): C, 58.89; H, 7.19; N, 12.49; S, 14.29. Found (percent): C, 59.21; H, 7.19; N, 12.36; S, 14.33.

EXAMPLE X

Replacing hexamethyleneimine of Example VIII with an equal molecular weight of ethylbutylamine, S-(3-pyridyl)methyl ethylbutylthiocarbamate is isolated as described in a yield of 77.5%, B.P. (0.03 mm.) 123–133.5° C., $n_D^{30}$ 1.5376.

Analysis.—Calculated for $C_{13}H_{20}N_2OS$ (percent): C, 61.86; H, 7.99; N, 11.10; S, 12.70. Found (percent): C, 61.60; H, 7.79; N, 10.83; S, 12.98.

EXAMPLE XI

Replacing dipropylamine of Example I with an equal molecular weight of ethylbutylamine, S-(2-pyridyl)methyl ethylbutylthiocarbamate is isolated as described in a yield of 93.9%, $n_D^{30}$ 1.5354.

Analysis.—Calculated for $C_{13}H_{20}N_2OS$ (percent): C, 61.86; H, 7.99; N, 11.10; S, 12.70. Found (percent): C, 61.65; H, 7.89; N, 10.63; S, 13.08.

EXAMPLE XII

Replacing 2-chloromethylpyridine hydrochloride of Example XI with an equal molecular weight of 4-chloromethylpyridine hydrochloride, S-(4-pyridyl)methyl ethylbutylthiocarbamate is isolated as described in a yield of 91.3%, $n_D^{30}$ 1.5362.

Analysis.—Calculated for $C_{13}H_{20}N_2OS$ (percent): C, 61.86; H, 7.99; N, 11.10; S, 12.70. Found (percent): C, 61.85; H, 7.88; N, 10.65; S, 12.79.

EXAMPLE XIII

Replacing ethylbutylamine of Example X with an equal molecular weight of diallylamine, S-(3-pyridyl)methyl diallylthiocarbamate is isolated as described in a yield of 76.1%. B.P. (0.03–0.02 mm.) 119–133° C., $n_D^{30}$ 1.5601.

Analysis.—Calculated for $C_{13}H_{16}N_2OS$ (percent): C, 62,87; H, 6.49; N, 11.28; S, 12.91. Found (percent): C, 63.05; H, 6.59; N, 11.20; S, 13.26.

EXAMPLE XIV

Replacing ethylbutylamine of Example X with an equal molecular weight of piperidine, S-(3-pyridyl)methyl 1-piperidinecarbothioate is isolated as described in a yield of 73.8%, B.P. (0.04–0.03 mm.) 137–146° C., $n_D^{30}$ 1.5762.

Analysis.—Calculated for $C_{12}H_{16}N_2OS$ (percent): C, 60.98; H, 6.82; N, 11.85; S, 13.57. Found (percent): C, 60.99; H, 6.95; N, 11.79; S, 13.47.

EXAMPLE XV

Replacing hexamethyleneimine and 3-chloromethylpyridine hydrochloride of Example VIII by equal molecular weights of diisopropylamine and 2-chloromethylpyridine hydrochloride, S-(2-pyridyl)methyl diisopropylthiocarbamate is isolated as described in a yield of 51.3%, B.P. (0.07 mm.) 115.5–121° C., $n_D^{30}$ 1.5403.

Analysis.—Calculated for $C_{13}H_{20}N_2OS$ (percent): C, 61.86; H, 7.99; N, 11.10; S, 12.70. Found (percent): C, 62.20; H, 7.72; N, 10.99; S, 12.63.

EXAMPLE XVI

Replacing 2-chloromethylpyridine hydrochloride of Example XV by an equal molecular weight of 3-chloromethylpyridine hydrochloride, S-(3-pyridyl)methyl diisopropylthiocarbamate is isolated as described in a yield of 59.6%, B.P. 118.5–127° C., $n_D^{30}$ 1.5401,

EXAMPLE XVII

Replacing 2-chloromethylpyridine hydrochlororide of Example XV by an equal molecular weight of 4-chloromethylpyridine hydrochloride, S-(4-pyridyl)methyl diisopropylthiocarbamate is isolated as described in a yield of 88.6%, B.P. (0.06–0.05 mm.) 119–133° C., M.P. 62.0–64.5° C.

*Analysis.*—Calculated for $C_{13}H_{20}N_2OS$ (percent): C, 61.86; H, 7.99; N. 11.10; S, 12.70. Found (percent): C, 61.53; H, 7.69; N, 10.87; S, 12.66.

EXAMPLE XVIII

Replacing dipropylamine of Example I by an equal molecular weight of di-n-butylamine, S-(2-pyridyl)methyl di-n-butylthiocarbamate is isolated as described in a yield of 82.5%, $n_D^{30}$ 1.5260.

*Analysis.*—Calculated for $C_{15}H_{24}N_2OS$ (percent): C, 64.24; H, 8.63; N, 9.99; S, 11.43. Found (percent): C, 64.44; H, 8.73; N, 9.68; S, 11.66.

EXAMPLE XIX

Replacing 2-chloromethylpyridine hydrochloride of Example XVIII by an equal molecular weight of 3-chloromethylpyridine hydrochloride, S-(3-pyridyl)methyl di-n-butylthiocarbamate is isolated as described in a yield of 86.9%, $n_D^{30}$ 1.5278.

*Analysis.*—Calculated for $C_{15}H_{24}N_2OS$ (percent): C, 64.24; H, 8.63; N, 9.99; S, 11.43. Found (percent): C, 64.20; H, 8.81; N, 9.71; S, 11.54.

EXAMPLE XX

Replacing 2-chloromethylpyridine hydrochloride of Example XVIII by an equal molecular weight of 4-chloromethylpyridine hydrochloride, S-(4-pyridyl)methyl di-n-butylthiocarbamate is isolated as described in a yield of 90.4%, $n_D^{30}$ 1.5270.

*Analysis.*—Calculated for $C_{15}H_{24}N_2OS$ (percent): C, 64.24; H, 8.63; N, 9.99; S, 11.43. Found (percent): C, 64.07; H, 8.88; N, 9.64; S, 11.20.

EXAMPLE XXI

Replacing dipropylamine of Example I by an equal molecular weight of diisobutylamine, S-(2-pyridyl)methyl diisobutylthiocarbamate is isolated as described in a yield of 92.6%, $n_D^{30}$ 1.5240.

*Analysis.*—Calculated for $C_{15}H_{24}N_2OS$ (percent): C, 64.24; H, 8.63; N, 9.99; S, 11.43. Found (percent): C, 64.26; H, 8.84; N, 9.63; S, 11.61.

EXAMPLE XXII

Replacing 2-chloromethylpyridine hydrochloride of Example XXI by an equal molecular weight of 3-chloromethylpyridine hydrochloride, S-(3-pyridyl)methyl diisobutylthiocarbamate is isolated as described in a yield of 85.8%, $n_D^{30}$ 1.5259.

*Analysis.*—Calculated for $C_{15}H_{25}N_2OS$ (percent): C, 64.24; H, 8.63; N, 9.99; S, 11.43. Found (percent): C, 64.08; H, 8.70; N, 9.77; S, 11.57.

EXAMPLE XXIII

Replacing 2-chloromethylpyridine hydrochloride of Example XXI by an equal molecular weight of 4-chloromethylpyridine hydrochloride, S-(4-pyridyl)methyl diisobutylthiocarbamate is isolated as described in a yield of 91.4%, $n_D^{30}$ 1.5246.

*Analysis.*—Calculated for $C_{15}H_{24}N_2OS$ (percent): C, 64.24; H, 8.63; N, 9.99; S, 11.43. Found (percent): C, 64.24; H, 8.81; N, 9.84; S, 11.67.

EXAMPLE XXIV

Replacing hexamethyleneimine of Example XV by an equal molecular weight of N-methylcyclohexylamine, S-(2-pyridyl)methyl methylcyclohexylthiocarbamate is isolated as described in a yield of 59.7%, $n_D^{30}$ 1.5628, B.P. (0.05 mm.) 136–148° C.

*Analysis.*—Calculated for $C_{14}H_{20}N_2OS$ (percent): C, 63.59; H, 7.62; N, 10.60; S, 12.13. Found (percent): C, 63.56; H, 7.93; N, 10.19; S, 11.70.

EXAMPLE XXV

Replacing 2-chloromethylpyridine hydrochloride of Example XXIV by an equal molecular weight of 3-chloromethylpyridine hydrochloride, S - (3 - pyridyl)methyl methylcyclohexylthiocarbamate is isolated as described in a yield of 58.5%, B.P. (0.05 mm.) 145–150° C., $n_D^{30}$ 1.5638.

*Analysis.*—Calculated for $C_{14}H_{20}N_2OS$ (percent): C, 63.59; H, 7.62; N, 10.60; S, 12.13. Found (percent): C, 63.40; H, 7.81; N, 10.35; S, 11.90.

EXAMPLE XXVI

Replacing dipropylamine of Example III by an equal molecular weight of N-methylcyclohexylamine, S-(4-pyridyl)methyl methylcyclohexylthiocarbamate is isolated as described in a yield of 73.5%, $n_D^{30}$ 1.5597.

*Analysis.*—Calculated for $C_{14}H_{20}N_2OS$ (percent): C, 63.59; H, 7.62; N, 10.60; S, 12.13. Found (percent): C, 63.40; H, 7.81; N, 10.35; S, 11.90.

EXAMPLE XXVI

Replacing dipropylamine of Example III by an equal molecular weight of N-methylcyclohexylamine, S-(4-pyridyl) methyl methylcyclohexylthiocarbamate is isolated as described in a yield of 73.5%, $n_D^{30}$ 1.5597.

*Analysis.*—Calculated for $C_{14}H_{20}N_2OS$ (percent): C, 63.59; H, 7.62; N, 10.60; S, 12.13. Found (percent): C, 63.52; H, 7.83; N, 10.71; S, 11.91.

EXAMPLE XXVII

Replacing dipropylamine of Example I by an equal molecular weight of N-ethylcyclohexylamine, S-(2-pyridyl) methyl ethylcyclohexylthiocarbamate is isolated as described in a yield of 51.5%, $n_D^{30}$ 1.5534.

*Analysis.*—Calculated for $C_{15}H_{22}N_2OS$ (percent): C, 64.70; H, 7.96; N, 10.06; S, 11.52. Found (percent): C, 64.87; H, 8.36; N, 10.00; S, 11.04.

EXAMPLE XXVIII

Replacing 2-chloromethylpyridine hydrochloride of Example XXVII with an equal molecular weight of 3-chloromethylpyridine hydrochloride, S-(3-pyridyl)methyl ethylcyclohexylthiocarbamate is isolated as described in a yield of 23.0%, $n_D^{30}$ 1.5540.

*Analysis.*—Calculated for $C_{15}H_{22}N_2OS$ (percent): C, 64.70; H, 7.96; N, 10.06; S, 11.52. Found (percent): C, 65.00; H, 8.10; N, 10.21; S, 11.04.

EXAMPLE XXIX

Replacing 2-chloromethylpyridine hydrochloride of Example XXVII with an equal molecular weight of 4-chloromethylpyridine hydrochloride, S-(4-pyridyl)methyl ethylcyclohexylthiocarbamate is isolated as described in a yield of 86.8%, $n_D^{30}$ 1.5561.

*Analysis.*—Calculated for $C_{15}H_{22}N_2OS$ (percent) C, 64.70; H, 7.96; N, 10.06; S, 11.52. Found (percent): C, 64.64; H, 7.78; N, 9.90; S, 11.30.

EXAMPLE XXX

There is charged to a reaction 30.3 g. (0.30 mole) of di-n-propylamine, 12.0 g. (0.30 mole) of sodium hydroxide and 150 cc. of water. The mixture is cooled to 10° and then 24.2 g. (0.317 mole) of carbon disulfide is added dropwise at 8–10° over an interval of 11 minutes. The mixture is stirred at 7–8° for an additional 4 minutes. There is added as rapidly as possible 24.6 g. (0.15 mole) of 2-chloromethylpyridine hydrochloride. The temperature rises from 7 to 11° C. The cooling bath is then removed and the mixture is allowed to stir for an additional three hours. The reaction mixture is extracted with 250 cc. of ethyl ether and the ether solution is washed with four 100 cc. portions of water, dried over anhydrous magnesium sulfate and concentrated under reduced pressure. The residue is a semi-solid which is dissolved in 200 cc. of hot hexane and then allowed to crystallize. The by-product crystals (4.9 g.) are filtered off and the hexane filtrate is concentrated under reduced pressure. The residue is then distilled under high vacuum. There is obtained 36.4 g. (91.4% yield) of 2-(pyridyl)methyl di-n-propyldithiocarbamate, B.P. (0.07 mm.) 146–156.5° C., $n_D^{30}$ 1.5918.

*Analysis.*—Calculated for $C_{13}H_{20}N_2S_2$ (percent): C, 58.16; H, 7.51; N, 10.44; S, 23.89. Found (percent): C, 58.36; H, 7.26; N, 10.37; S, 24.11.

EXAMPLE XXXI

Replacing 2-chloromethylpyridine hydrochloride of Example XXX with an equal molecular weight of 3-chloromethylpyridine hydrochloride, 3-(pyridyl)methyl di-n-propyldithiocarbamate is isolated as described in a yield of 77.6%, B.P. (0.07 mm.) 157.0–160.5° C., $n_D^{30}$ 1.5931.

*Analysis.*—Calculated for $C_{13}H_{20}N_2S_2$ (percent): C, 58.16; H, 7.51; N, 10.44; S, 23.89. Found (percent-: C, 58.33; H, 7.71; N, 10.40; S, 23.73.

EXAMPLE XXXII

Replacing 2-chloromethylpyridine hydrochloride of Example XXX with an equal molecular weight of 4-chloromethylpyridine hydrochloride, 4-(pyridyl)methyl di-n-propyldithiocarbamate is isolated as described in a yield of 88.9%, B.P. (0.08–0.07 mm.) 162.0–163.5° C., $n_D^{30}$ 1.5934.

*Analysis.*—Calculated for $C_{13}H_{20}N_2S_2$ (percent): C, 58.16; H, 7.51; N, 10.44; S, 23.89. Found (percent): C, 58.02; H, 7.22; N, 10.15; S, 23.78.

EXAMPLE XXXIII

Replacing di-n-propylamine of Example I with an equal molecular weight of diamylamine, S-(2-pyridyl)methyl di-amylthiocarbamate is isolated as described in a yield of 91.3%, $n_D^{30}$ 1.5195.

*Analysis.*—Calculated for $C_{17}H_{28}N_2OS$ (percent): C, 66.19; H, 9.15; N, 9.08; S, 10.39. Found (percent): C, 66.23; H, 8.92; N, 8.83; S, 10.76.

EXAMPLE XXXIV

Replacing dipropylamine of Example XXX with an equal molecular weight of di-n-butylamine and distilling the crude product through a falling film still instead of a Claison-type distillation apparatus, 2-(pyridyl)methyl di-n-butyldithiocarbamate is isolated as described in a yield of 88.5%, $n_D^{30}$ 1.5766.

*Analysis.*—Calculated for $C_{15}H_{24}N_2S_2$ (percent): C, 60.76; H, 8.16; N, 9.45; S, 21.63. Found (percent): C, 60.90; H, 8.27; N, 9.22; S, 21.79.

EXAMPLE XXXV

Replacing dibutylamine of Example XXXIV with an equal molecular weight of diisobutylamine, 2-(pyridyl) methyl diisobutyldithiocarbamate is isolated as described in a yield of 92.2%, $n_D^{30}$ 1.5745.

*Analysis.*—Calculated for $C_{15}H_{29}N_2S_2$ (percent): C, 60.76; H, 8.16; N, 9.45; S, 21.63. Found (percent): C, 60.76; H, 7.86; N, 9.39; S, 21.48.

Other examples of compounds falling within the generic formula presented herein, which are preparable by the aforedescribed procedures and which may be formulated into herbicidal compositions and applied as herein illustrated are:

S-(2-pyridyl)methyl 1-pyrollidinecarbothioate
S-(3-pyridyl)methyl 1-pyrollidinecarbothioate
S-(2-pyridyl)methyl di-2-butenylthiocarbamate
S-(3-pyridyl)methyl di-2-butenylthiocarbamate
S-(2-pyridyl)methyl di-(2-methallyl)thiocarbamates
S-(3-pyridyl)methyl di-(2-methallyl)thiocarbamates
S-(2-pyridyl)methyl di-n-hexylthiocarbamate
S-(3-pyridyl)methyl di-n-hexylthiocarbamate
S-(2-pyridyl)methyl di-isohexylthiocarbamate
S-(3-pyridyl)methyl di-isohexylthiocarbamate
S-(2-pyridyl)methyl n-hexylethylthiocarbamate
S-(3-pyridyl)methyl n-hexylethylthiocarbamate
S-(2-pyridyl)methyl 1-(2',4'-dimethylpiperidinecarbothioate)
S-(3-pyridyl)methyl 1-(2',4'-dimethylpiperidinecarbothioate)
S-(3-pyridyl)methyl 1 - (3',4' - dimethylpiperidinecarbothioate)
S-(4-pyridyl)methyl 1-(3',4'-dimethylpiperidinecarbothioate)

The following is a table of the compounds prepared in the above-described examples.

TABLE I

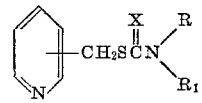

| Compound number | Pyridyl ring position of substitution | X | R | R₁ |
|---|---|---|---|---|
| 1 | 2 | O | n-Propyl | n-Propyl |
| 2 | 3 | O | do | Do. |
| 3 | 4 | O | do | Do. |
| 4 | 2 | O | 1-methyl-4-ethyl-pentamethylene | |
| 5 | 3 | O | 1-methyl-4-ethyl-pentamethylene | |
| 6 | 4 | O | Hexamethylene | |
| 7 | 2 | O | Hexamethylene | |
| 8 | 3 | O | Hexamethylene | |
| 9 | 3 | O | Ethyl | Ethyl |
| 10 | 3 | O | do | n-Butyl |
| 11 | 2 | O | do | Do. |
| 12 | 4 | O | do | Do. |
| 13 | 3 | O | Allyl | Allyl |
| 14 | 3 | O | Pentamethylene | |
| 15 | 2 | O | i-Propyl | i-Propyl |
| 16 | 3 | O | do | Do. |
| 17 | 4 | O | do | Do. |
| 18 | 2 | O | n-Butyl | n-Butyl |
| 19 | 3 | O | do | Do. |
| 20 | 4 | O | do | Do. |
| 21 | 2 | O | i-Butyl | i-Butyl |
| 22 | 3 | O | do | Do. |
| 23 | 4 | O | do | Do. |
| 24 | 2 | O | Cyclohexyl | Methyl |
| 25 | 3 | O | do | Do. |
| 26 | 4 | O | do | Do. |
| 27 | 2 | O | do | Ethyl |
| 28 | 3 | O | do | Do. |
| 29 | 4 | O | do | Do. |
| 30 | 2 | S | n-Propyl | n-Propyl |
| 31 | 3 | S | do | Do. |
| 32 | 4 | S | do | Do. |
| 33 | 2 | O | n-Amyl | n-Amyl |
| 34 | 2 | S | n-Butyl | n-Butyl |
| 35 | 2 | S | i-Butyl | i-Butyl |

HERBICIDAL SCREENING TESTS

As previously mentioned, the herein described compounds produced in the above-described manner are phytotoxic compounds which are useful and valuable in controlling various plant species. Compounds of this invention are tested as herbicides in the following manner.

Pre-emergence herbicide test: On the day preceding treatment, seeds of seven different weed species are planted in individual rows using one species per row across the width of the flat. The seeds used are hair crabgrass (*Digitaris sanguinalis* (L.) Scop.), yellow foxtail (*Setaria glauca* (L.) beauv.), watergrass (*Echinochloa crusgalli* (L.) Beauv.), California red oat (*Avena sativa* (L.)), redroot pigweed (*Amaranthus retroflexus* (L.)), Indian mustard (*Brassica juncea* (L.) Coss.) and curly dock (*Rumex crispus* (L.). Ample seeds are planted to give about 20 to 50 seedlings per row, after emergence, depending on the size of the plants. The flats are watered after planting. The spraying solution is prepared by dissolving 50 mg. of the test compound in 3 ml. of a solvent, such as acetone, containing 1% Tween 20® (polyoxyethylene sorbitan monolaurate). The following day each flat is sprayed at the rate of 20 pounds of the candidate compound per 80 gallons of solution per acre. An atomizer is used to spray the solution onto the soil surface. The flats are placed in a greenhouse at 80° F. and watered regularly. Two weeks later the degree of weed control is determined by comparing the amount of germination and growth of each weed in the treated flats with weeds in several untreated control flats. The rating system is as follows:

—=no significant injury (0–15 percent control)
+=slight injury (25–35 percent control)
++=moderate injury (55–65 percent control)
+++=severe injury or death (85–100 percent control)

An activity index is used to represent the total activity on all seven weed species. It is the sum of the number of plus marks, so that an activity index of 21 represents complete control of all seven weeds. The results of this test are reported in Table II.

Post-emergence herbicide test: Seeds of five weed species including hairy crabgrass, watergrass, California red oats, Indian mustard, and curly dock and one crop, pinto beans (*phaseolus vulgaris*), are planted in flats as described above for pre-emergence screening. The flats are placed in the greenhouse at 72–85° F. and watered daily with a sprinkler. About 10 to 14 days after planting when the primary leaves of the bean plant are almost fully expanded and the first trifoliate leaves are just starting to form, the plants are sprayed. The spray is prepared by weighing out 50 mg. of the test compound, dissolving it in 5 ml. of acetone containing 1% Tween 20® (polyoxyethylene sorbitan monolaurate) and then adding 5 ml. of water. The solution is sprayed on the foliage using an atomizer. The spray concentration is 0.5% and the rate would be approximately 20 lb./acre if all of the spray were retained on the plant and the soil, but some spray is lost so it is estimated that the application rate is approximately 12.5 lb./acre.

Beans are used to detect defoliants and plant growth regulators. The beans are trimmed to two or three plants per flat by cutting off the excess weaker plants several days before treatment. The treated plants are placed back in the greenhouse and care is taken to avoid sprinkling the treated foliage with water for three days after treatment. Water is applied to the soil by means of a slow stream from a watering hose taking care not to wet the foliage.

Injury rates are recorded 14 days after treatment. The rating system is the same as described above for the pre-emergence test where (−), (+), (++), and (+++) are used for the different rates of injury and control. The injury symptoms are also recorded. The maximum activity index for complete control of all the species in the post-emergence screening test is 18 which represents the sum of the plus marks obtained with the six plant species used in the test. The herbicide activity index is shown in Table II.

TABLE II.—HERBICIDAL ACTIVITY SCREENING RESULT

| Compound Number | Herbicidal activity index [1] | |
|---|---|---|
| | Pre-emergence (20 lbs./acre) | Post-emergence (12.5 lbs./acre) |
| 1 | 17 | 15 |
| 2 | 16 | 18 |
| 3 | 15 | 15 |
| 4 | 11 | 13 |
| 5 | 11 | 14 |
| 6 | 11 | 11 |
| 7 | 10 | 13 |
| 8 | 7 | 13 |
| 9 | 10 | 14 |
| 10 | 12 | 18 |
| 11 | 16 | 18 |
| 12 | 16 | 17 |
| 13 | 4 | 13 |
| 14 | 0 | 12 |
| 15 | 15 | 15 |
| 16 | 15 | 17 |
| 17 | 15 | 16 |
| 18 | 10 | 18 |
| 19 | 9 | 18 |
| 20 | 12 | 18 |
| 21 | 14 | 18 |

TABLE II.—Continued

| Compound Number | Herbicidal activity index [1] | |
|---|---|---|
| | Pre-emergence (20 lbs./acre) | Post-emergence (12.5 lbs./acre) |
| 22 | 14 | 18 |
| 23 | 11 | 16 |
| 24 | 9 | 18 |
| 25 | 13 | 18 |
| 26 | 8 | 17 |
| 27 | 9 | 17 |
| 28 | 9 | 17 |
| 29 | 4 | 17 |
| 30 | 15 | 18 |
| 31 | 14 | 16 |
| 32 | 18 | 16 |
| 33 | 2 | 8 |
| 34 | 6 | 9 |
| 35 | 7 | 11 |

[1] 21=85–100% control of all 7 weed species tested pre-emergence; 18=85–100% control of all 6 weed species tested post-emergence.

Compound Number 18, S-(2-pyridyl)methyl di-n-butylthiocarbamate is highly selected in controlling crabgrass in both pre-emergence and post-emergence application. This compound was applied as a pre-emergent and as a post-emergent to the four turf grasses: bentgrass (*Agrostis palustris*), perennial rye grass (*Lolium perenne*), chewing fescue (*Festuca ruba*, var. *commutata*), Bermuda grass (*Cynodon dactylon*), and crabgrass (*Digitaria sanguinalis*). Crabgrass is controlled 100 percent with pre-emergence treatments of the compound at a rate of one (1) pound per care. None of the four turf grasses are injured. At higher rates Bermuda grass was injured slightly. In post-emergence application with the compound crabgrass is controlled and very little injury of the turf grasses, particularly bentgrass and Bermuda grass, was noted at one (1) and two (2) pounds per acre.

The compounds of the present invention are used as pre-emergence or post-emergence herbicides and are applied in a variety of ways at various concentrations. In practice, the compounds are formulated with an inert carrier, utilizing methods well known to those skilled in the art, thereby making them suitable for application as dusts, sprays, or drenches and the like in the form and manner required. The mixtures can be dispersed in water with the aid of a wetting agent or they can be employed in organic liquid compositions, oil and water, water in oil emulsions, with or without the addition of wetting, dispersing or emulsifying agents. The amount applied depends upon the nature of the seeds or plants to be controlled and the rate of application varies from 1 to approximately 50 pounds per acre.

The phytotoxic compositions of this invention are applied to the plants in the conventional manner. Thus, the dust and liquid compositions can be applied to the plant by the use of power-dusters, boom and hand sprayers and spray-dusters. The compositions can also be applied from airplanes as a dust or a spray because they are effective in very low dosages. In order to modify or control growth of germinating seeds or emerging seedlings, as a typical example, the dust and liquid compositions are applied to the soil according to conventional methods and are distributed in the soil to a depth of at least ½-inch below the soil surface. It is not necessary that the phytotoxic compositions be admixed with the soil particles and these compositions can be applied merely by spraying or sprinkling the surface of the soil. The phytotoxic compositions of this invention can also be applied by addition to irrigation water supplied to the field to be treated. This method of application permits the penetration of the compositions into the soil as the water is absorbed therein. Dust compositions, granular compositions or liquid formulations applied to the surface of the soil can be distributed below the surface of the soil by conventional means such as discing, dragging or mixing operations.

The phytotoxic compositions of this invention can also contain other additaments, for example fertilizers, pesticides and the like, used as adjuvant or in combination with any of the above-described adjuvants. Other phytotoxic compounds useful in combination with the above-described compounds include for example 2,4-dichlorophenoxyacetic acids, 2,4,5-trichlorophenoxyacetic acid, 2-methyl-4-chlorophenoxyacetic acid and the salts, esters and amides thereof; triazine derivatives, such as 2,4-bis-(3-methoxypropylamino)-6-methylthio-S-triazine, 2- chloro-4-ethylamino-6-isopropylamino-S-triazine, and 2-ethylamino-4-isopropylamino - 6 - methylmercapto-S-triazine; urea derivatives, such as 3-(3,4-dichlorophenyl)-1,1-dimethyl urea and 3-(p-chlorophenyl)-1,1-dimethyl urea and acetamides such as N,N-diallyl-α-chloroacetamide, N-(α-chloroacetyl)hexamethylene imine, and N,N-diethyl-α-bromoacetamide and the like; benzoic acids such as 3-amino-2,5-dichlorobenzoic acid; thiocarbamates, such as S-propyl dipropylthiocarbamate, S-ethyl-dipropylthiocarbamate, S-ethyl-cyclohexyl-ethyl-thiocarbamate, S-ethyl hexahydro-1H-azepine-1-carbothioate and the like. Fertilizers useful in combination with the active ingredients include for example, ammonium nitrate, urea and superphosphate. Other useful additaments include materials in which plant organisms take root and grow such as compost, manure, humus, sand and the like.

The concentration of a compound of the present invention, constituting an effective amount in the best mode of administration in the utility disclosed is readily determinable by those skilled in the art. Various changes and modifications are possible without departing from the spirit and scope of the invention described herein and will be apparent to those skilled in the art to which it pertains. It is accordingly intended that the present invention shall only be limited by the scope of the claims.

What is claimed is:

1. A compound having the formula

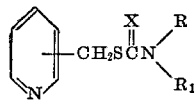

in which X is oxygen or sulfur, R and $R_1$ are independently alkyl having 1 to 6 carbon atoms, inclusive, alkenyl having 3 to 4 carbon atoms, inclusive, or cyclohexyl and R and $R_1$ taken together are hexamethylene, provided that when X is sulfur, only one of R or $R_1$ is alkyl.

2. A compound according to claim 1 in which X is oxygen and R is alkyl and $R_1$ is alkyl.

3. A compound according to claim 2 in which R is n-propyl, $R_1$ is n-propyl and the pyridyl ring is substituted in the 2-position.

4. A compound according to claim 2 in which R is n-propyl, $R_1$ is n-propyl and the pyridyl ring is substituted in the 3-position.

5. A compound according to claim 2 in which R is n-propyl, $R_1$ is n-propyl and the pyridyl ring is substituted in the 4-position.

6. A compound according to claim 2 in which R is ethyl, $R_1$ is ethyl and the pyridyl ring is substituted in the 3-position.

7. A compound according to claim 2 in which R is ethyl, $R_1$ is n-butyl and the pyridyl ring is substituted in the 3-position.

8. A compound according to claim 2 in which R is isopropyl, $R_1$ is isopropyl and the pyridyl ring is substituted in the 2-position.

9. A compound according to claim 2 in which R is isopropyl, $R_1$ is isopropyl and the pyridyl ring is substituted in the 3-position.

10. A compound according to claim 2 in which R is isopropyl, $R_1$ is isopropyl and the pyridyl ring is substituted in the 4-position.

11. A compound according to claim 2 in which R is n-butyl, $R_1$ is n-butyl and the pyridyl ring is substituted in the 2-position.

12. A compound according to claim 2 in which R is n-butyl, $R_1$ is n-butyl and the pyridyl ring is substituted in the 3-position.

13. A compound according to claim 2 in which R is n-butyl, $R_1$ is n-butyl and the pyridyl ring is substituted in the 4-position.

14. A compound according to claim 2 in which R is isobutyl, $R_1$ is isobutyl and the pyridyl ring is substituted in the 2-position.

15. A compound according to claim 2 in which R is isobutyl, $R_1$ is isobutyl and the pyridyl ring is substituted in the 3-position.

16. A compound according to claim 2 in which R is isobutyl, $R_1$ is isobutyl and the pyridyl ring is substituted in the 4-position.

17. A compound according to claim 2 in which R is ethyl, $R_1$ is n-butyl and the pyridyl ring is substituted in the 2-position.

18. A compound according to claim 2 in which R is ethyl, $R_1$ is n-butyl and the pyridyl ring is substituted in the 4-position.

19. A compound according to claim 2 in which R is n-amyl, $R_1$ is n-amyl and the pyridyl ring is substituted in the 2-position.

20. A compound according to claim 1 in which X is oxygen and R and $R_1$ taken together are alkylene.

21. A compound according to claim 20 in which R and $R_1$ taken together are hexamethylene and the pyridyl ring is substituted in the 3-position.

22. A compound according to claim 20 in which R and $R_1$ taken together are hexamethylene and the pyridyl ring is substituted in the 2-position.

23. A compound according to claim 1 in which X is oxygen and R is alkenyl and $R_1$ is alkenyl.

24. A compound according to claim 23 in which R is allyl, $R_1$ is allyl and the pyridyl ring is substituted in the 3-position.

25. A compound according to claim 1 in which X is oxygen, R is cyclohexyl and $R_1$ is alkyl.

26. A compound according to claim 25 in which $R_1$ is methyl and the pyridyl ring is substituted in the 4-position.

27. A compound according to claim 25 in which $R_1$ is methyl and the pyridyl ring is substituted in the 3-position.

28. A compound according to claim 25 in which $R_1$ is methyl and the pyridyl ring is substituted in the 4-position.

29. A compound according to claim 1 in which X is oxygen and R and $R_1$ taken together are hexamethylene.

30. A compound according to claim 25 in which $R_1$ is ethyl and the pyridyl ring is substituted in the 3-position.

31. A compound according to claim 25 in which $R_1$ is ethyl and the pyridyl ring is substituted in the 4-position.

32. A compound having the formula

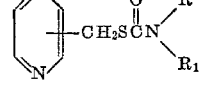

in which R and $R_1$ are independently alkyl, having 1 to 6 carbon atoms, inclusive, alkenyl having 3 to 4 carbon atoms, inclusive, or cyclohexyl and R and $R_1$ taken together are hexamethylene.

References Cited

UNITED STATES PATENTS 2,937,090   5/1960   Kennard et al. _____ 96—107

OTHER REFERENCES

Kennard et al.: J. Org. Chem., vol. 24, pp. 464–469, April, 1959, QD241J6.

ALAN L. ROTMAN, Primary Examiner

U.S. Cl. X.R.

71—94; 260—293.4

PO-1050
(5/69)

UNITED STATES PATENT OFFICE
CERTIFICATE OF CORRECTION

Patent No. __3,579,525__                    Dated __May 18, 1971__

Inventor(s) __Harry Tilles and Mervin E. Brokke__

It is certified that error appears in the above-identified patent and that said Letters Patent are hereby corrected as shown below:

Column 1, line 61, the word reading "deivations", should read ---deviations---.

Column 2, line 6, the word reading "alyl", should read ---allyl---.

Column 2, the portion of line 59 reading "cooling the bath", should read ---cooling bath---.

Column 3, line 57, the numerals "1.56.12", should read --- 1.5612 ---.

Column 3, line 59, the numerals "72.5", should read --- 7.25 ---.

Column 4, line 46, the numerals "62,87", should read --- 62.87 ---.

Column 12, line 23, in Claim 20, the word reading "alkylene", should read ---hexamethylene---.

Column 12, line 46, in Claim 29, the numeral "1", should read --- 25 ---.

Column 6, lines 18 through 26, inclusive, reading "EXAMPLE XXVI", please delete in toto.

Signed and sealed this 25th day of January 1972.

(SEAL)
Attest:

EDWARD M. FLETCHER, JR.         ROBERT GOTTSCHALK
Attesting Officer              Commissioner of Patents